United States Patent Office 3,071,449
Patented Jan. 1, 1963

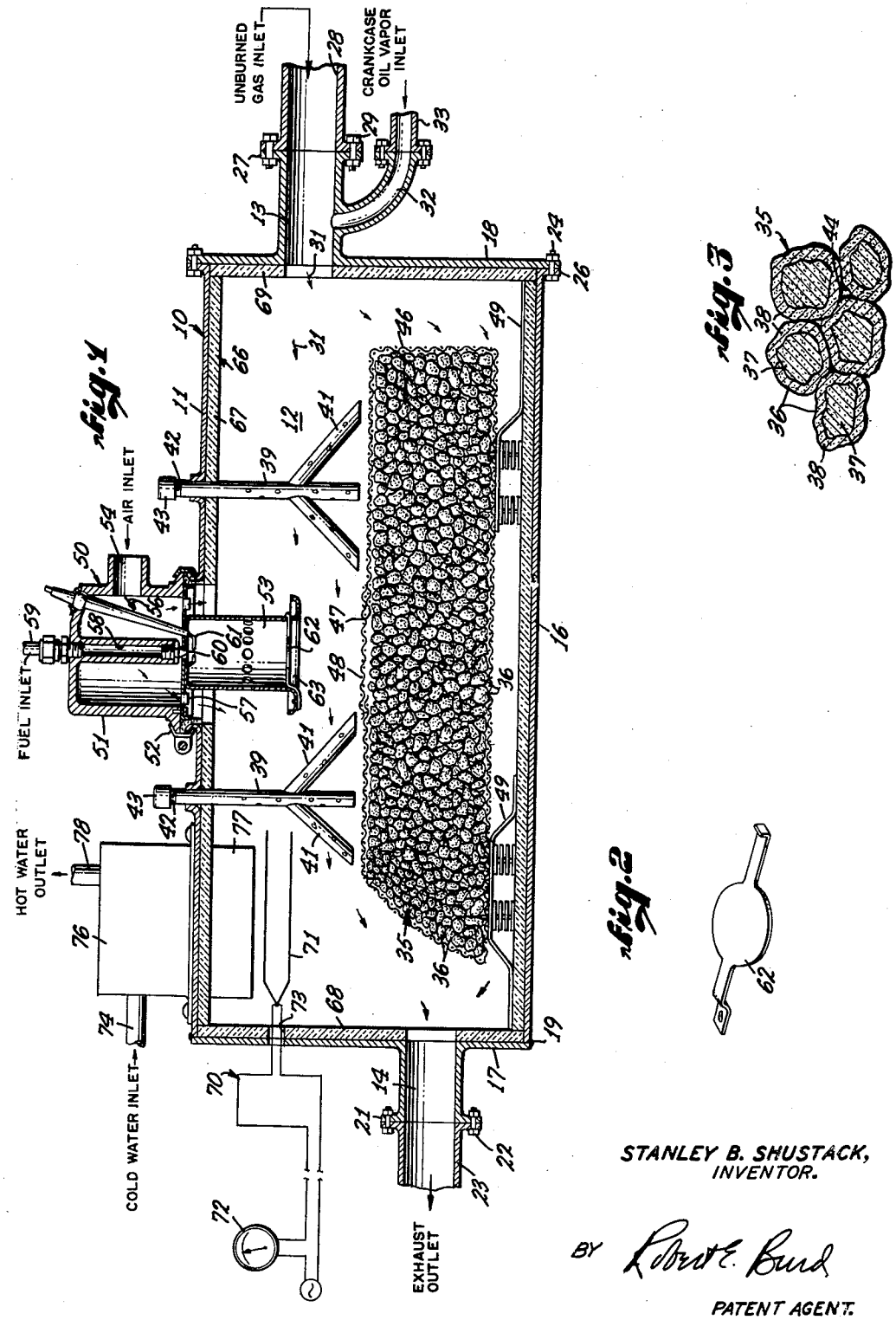

3,071,449
APPARATUS FOR CATALYTIC TREATMENT OF INTERNAL COMBUSTION ENGINE EXHAUST GASES
Stanley B. Shustack, 17530 Ventura Blvd., Encino, Calif.
Filed Oct. 3, 1960, Ser. No. 59,928
2 Claims. (Cl. 23—288)

This invention relates to a means and method for purifying the exhaust gases of an internal combustion engine and the like and more particularly to a new and improved muffler construction intercepting the exhaust line of an internal combustion engine for pyrocatalytically treating unburned hydrocarbons and other fractions in the exhaust gases to render the noxious gases harmless.

In the past, extensive efforts have been made to render noxious exhaust gases harmless and many methods and expedients have been proposed, including the use of catalysts, but due to various defects in the prior proposals, none of them has shown any promise of successful utilization.

In general, the present invention provides an improved method and apparatus for using a catalyst to accelerate combustion and thermal decomposition of such unburned hydrocarbons and other exhaust gas fractions, down to elemental carbon and hydrogen.

This invention further provides a new and improved catalyst bed comprising a plurality of gravel-sized pellets having highly heat-tolerant cores coated with a relatively thin layer of a catalytic metal oxide or a mixture of several selected metal oxides and a new and improved means and method for recoating the pellets with like catalytic material for greater economy, efficiency and practical maintenance of the device.

The results of typical analyses of automobile exhaust gases indicate that any exhaust device, to be commercially successful, must provide a simple and inexpensive method for combustion and thermal decomposition of exhaust gases into elemental carbon, hydrogen and oxygen. For successful operation, the noxious components of the automobile exhaust gases must be reduced or decomposed into a harmless state.

The following chart sets forth the results of a typical analysis of automobile exhaust gases and their noxious components in the percentages evolved at various operating conditions as indicated. The figures as shown in the chart are fairly representative for cars performing the four conditions of idling, acceleration, cruising and deceleration. The actual quantities emitted may vary considerably from these figures, depending upon the condition of the car that is operating and its manner of operation. Hydrocarbons shown in the chart are the most important contaminants in automobile exhaust, from the standpoint of formation of smog:

*Results of a Typical Analysis of Automobile Exhaust Gases*

|  | Idling | Acceleration | Cruising | Deceleration |
|---|---|---|---|---|
| Hydrocarbons ($C_3$–$C_6$) as Hexane, p.p.m. | 1,275 | 410 | 354 | 5,125 |
| Acetylenic as Acetylene or Olefinic, p.p.m. | 825 | 18 | 64 | 687 |
| Oxides of Nitrogen as ($NO_2$), p.p.m. | 8 | 4,180 | 1,606 | 18 |
| Lower Aldehydes as Formaldehyde, p.p.m. | 88 | 1,369 | 264 | 193 |
| Carbon Monoxide (CO), percent | 3.6 | 0.0 | 0.4 | 1.5 |
| Carbon Dioxide ($CO_2$), percent | 10.0 | 13.7 | 12.9 | 6.1 |
| Oxygen ($O_2$), percent | 1.4 | 1.3 | 1.1 | 9.5 |

A single pyrolytic chamber is all that is required to thermally decompose unburned hydrocarbons for a single or dual exhaust system, respectively, also the acetylenic, olefinic and lower aldehyde fractions (which contain the carbon atom) emitted from an internal combustion engine. This is because the gases discharged contain from 3.6% to approximately 1.5% carbon monoxide, all of which at elevated temperatures in the pyrolytic chamber is reducible to carbon and hydrogen and partly to carbon dioxide ($CO_2$). The gases are pyrolyzed or burned after they have traversed a comparatively short path over the burning catalytic bed of this invention. The unburned hydrocarbons now emitted to the atmosphere in the operation of motor vehicles not having effective afterburners are the main cause of air pollution detrimental to life and property in the atmospheric condition known as smog.

This invention provides an improved pyrocatalytic apparatus which, when attached to the exhaust manifold of an internal combustion engine, and the like, prevents the partly burned and unburned hydrocarbon exhaust gases from polluting the atmosphere, because the carbon atom in the presence of a burning catalyst is separated from the hydrogen atom and the carbon monoxide molecule, setting free the hydrogen and oxygen atoms which react to form water vapor. The carbon is expelled in harmless form while the hydrogen is likewise expelled in either free form or combined with oxygen as water.

It is therefore an object of this invention to provide a new and improved means and method for purifying the exhaust gases of internal combustion engines, and the like, so as to thermally decompose known irritant unburned hydrocarbons and other fractions in the exhaust gases to appreciably reduce the causes of smog.

More specifically, it is an object of this invention to provide a new and improved means and method which utilizes a catalyst and a means for igniting the catalyst to a temperature suitable for decomposing the noxious gases.

Another object of this invention is to provide a catalyst bed which provides increased surface areas exposed to the gases and is economically produced and replaced or regenerated for improved combustion and greater economy of operation and maintenance of the apparatus.

Yet another object of this invention is to provide a new and improved means and method in which both unburned hydrocarbons and other fractions in the exhaust gases and the crank case oil vapors are thermally decomposed.

A further object of this invention is to provide a new and improved means and method of the character described which includes an improved catalyst igniting means which is adapted to be automatically operated when the engine is operated and is in constant operation for constant operational efficiency.

A still further object of this invention is to provide indicator means combined with the apparatus for remotely indicating the condition within the apparatus so as to provide visual, or other, indication of efficient operation and facilitate policing of smog conditions by air pollution control authorities.

Another object of this invention is to provide a new and improved apparatus of the character described which is economical to manufacture, capable of mass production and of interchangeability of parts thereof.

An important feature of this invention is the provision for means for recoating recoatable pellets for regeneration thereof for greater economy and efficiency.

A general object of this invention is to provide a new and improved means and method of the character described which overcomes disadvantages of prior means and methods heretofore intended to accomplish generally similar purposes.

These and other objects of this invention will be more apparent from the following detailed description, drawings and appended claims.

In the drawings:

FIGURE 1 is a vertical, cross-sectional view, as taken substantially through the center of the improved pyrocatalytic means of this invention;

FIGURE 2 is an enlarged, perspective view of a portion thereof; and

FIGURE 3 is an enlarged, cross-sectional view, as taken substantially through a plurality of catalyst coated pellets comprising the catalyst bed illustrated in FIGURE 1.

Referring in detail to the drawings, there is shown by way of illustration, but not of limitation, a new and improved pyrocatalytic means designed and constructed in accordance with this invention and referred to generally by the numeral 10.

The apparatus 10 comprises a housing 11 defining a chamber 12 having an inlet 13 and an outlet 14 and being otherwise hermetically sealed from the atmosphere. The housing 11 may be conveniently formed of a tubular wall 16 of rounded, elliptical or other configuration and closed at its ends by end walls 17 and 18. The end wall 17 is preferably permanently secured as by welding, indicated at 19, or the like, and has integrally, or otherwise, formed therewith a tubular extension forming the outlet 14. The tubular extension or outlet 14 has a flange 21 formed integrally therewith to facilitate securement as by fasteners 22 to an exhaust pipe 23 leading, in conventional manner, to the rear of the vehicle (not shown).

The end wall 18 is preferably removably secured to the tubular wall 16 as by fasteners 24, in the form of bolts or the like, extending through the end wall 18 and a flange 26 formed integrally with or secured to the tubular wall 16. A tubular extension extends therefrom to form the inlet opening 13 which is provided with a flange 27 to facilitate securement to the exhaust manifold 28, as by fasteners 29, of the internal combustion engine and through which exhaust gases from the engine (not shown) are directed into the chamber 12 as indicated by the arrows 31.

A tubular branch 32 is preferably formed and communicating with the inlet tubular extension 13 to which a conduit 33 may be conveniently secured and communicated with the crank case oil gas vapor outlet (not shown) for communicating crank case oil vapor to the inlet 13 which is carried by the exhaust gases from the exhaust manifold 28 into the chamber 12 for a purpose which will be hereinafter described.

A catalyst bed, generally designated by the numeral 35 is supported within the chamber 12 for pyrocatalytic action relative to unburned hydrocarbons and other fractions in the exhaust gases directed into the chamber 12 to assist in thermal decomposition thereof in a manner to be herein described. As best seen in FIGURES 1 and 3, the catalyst bed 35 comprises a plurality of relatively small irregularly-shaped pellets 36, preferably of a gravel size. Each pellet 36 comprises a core 37 of a porous material which tolerates high temperatures, preferably a pumice stone, and coated with a metal oxide catalytic agent designated by the numeral 38. It has been found that the oxides of iron, nickel and cobalt all strongly favor the complete chemical decomposition of the unburned hydrocarbons and other fractions, particularly nitro oxides of the exhaust gases. The nickel oxide is more active than the iron oxide and cobalt oxide is the most active for the decomposition of the unburned, noxious gases at temperatures ranging from 950 degrees F. to 1250 degrees F.

To form the coating of metal oxides 38, a dry mixture, preferably includes one part of iron oxide, two parts of nickel oxide, three parts of cobalt oxide and one part of a rapid setting, cementitious adhesive material, such as alumdum. These components are mixed in a dry state, after which water is added. The metal oxides and alumdum in this fluid-suspended state is poured, sprayed or otherwise applied to the exterior of the cores 17.

The catalyst coating 38 of approximately $\frac{1}{32}$ of an inch in thickness has been found to provide satisfactory service for approximately five thousand miles of normal driving. During driving the catalyst coating becomes partly covered by carbon, especially in urban driving, after which the coating is to be renewed or recoated approximately ever 3000 miles. For this purpose, refilling tubes 39, two herein shown, are affixed as to the upper portion of the tubular wall 16 and having one or more extensions or branches 41 for dispersing the fluid-suspended mixture of metal oxides and adhesive. Open ends 42 extending outwardly of the tubular wall 16 are capped as by removable caps 43. To recoat the pellets 36, the caps 43 are removed and the recoating fluid mixture is poured through the tubes 39 to be directed over the pellets 36 to recoat each pellet. The alumdum is a very rapid-setting adhesive which enables complete and fast recoating of each particle. After recoating, the caps 43 are threadedly or otherwise secured to the open ends 42 to reseal the chamber 12. The tubes 39 are preferably perforated so that residue mixture of coating material may be burned off during the pyrolytic action during operation of the apparatus 10.

It has been found that by the use of irregularly-shaped pellets, such as 36, rather than a solid catalyst mass, the area of catalyst exposed to the exhaust gases is greatly increased inasmuch as the gases may flow between the inner spaces 44 between pellets. Greater economy is afforded inasmuch as a solid mass of catalyst is comparatively expensive whereas the pumice cores 37 are relatively inexpensive and the coating 38 relatively thin and therefore relatively inexpensive.

The pellets 36 may be conveniently contained within a perforated basket 46 having an opening 47 through which additional pellets like 36 may be added if necessary by removal of a similarly perforated cap indicated at 48. The basket 46 is removably supported within the chamber 12 as by spring clips indicated at 49, the entire basket being removable from the chamber 12 as through the open end of the tubular wall 16 when the end wall 18 is removed.

Furthermore, the forming of the catalyst with a plurality of recoatable pellets 36 facilitates policing of the device by control authorities. When the pellets 36 are recoated, it is recommended that a servicing notation be made on a sticker or the like, which when checked by a control officer, will indicate whether the catalyst has been regenerated within the proper period of time or mileage driven by the vehicle. An additional indicator means for checking the condition of the apparatus will be hereinafter described.

In accordance with catalytic chemistry, metal oxides readily give off electrons which facilitate the breaking of bonds of the hexane molecules, forming (C=C) double bonds known as soot or carbon black, plus ($H_2$) hydrogen, when the temperature thereof is raised to approximately 1100 degrees F. For this purpose the apparatus 10 is provided with an ignition means generally designated by the numeral 50 extending into the chamber 12 for igniting the catalytic bed 38.

The igniting means 50 includes a housing 51 enclosing an air intake chamber removably secured to the housing 11 forming the chamber 12 as by a clamp indicated at 52. The housing 51 includes a mixing or combustion chamber 53 extending into the chamber 12 and an air inlet 54 adapted to be secured for communication to an air blower (not shown) for forcing air into the chamber 12, the air being indicated by the arrows 56 and entering the chamber 12 as through a perforated plate 57. A fuel passageway 58 extends centrally through the housing 51 and communicates between a fuel conduit 59 and a nozzle 60 having an orifice directed into the mixing chamber 53, forming a very fine spray. An igniter 61 in the form of a spark plug, forms a spark adjacent to the nozzle 60 for igniting the spray of fuel in the mixing chamber 53. A baffle 62 is preferably formed at the opening 63 of the mixing chamber 53 to disperse fuel.

In operation, a fuel control valve (not shown) is energized during operation of the engine to supply fuel to the nozzle 60 whereas an ignition coil (not shown) supplies a continuous hot spark to the point of the spark plug 61 to ignite the fuel-air mixture. A flaming zone is thereby created within the chamber 12 which immediately ignites the metal oxide coating 38 of the pellets 36 which immediately burns the partly burned and unburned noxious exhaust gases. The temperature in the chamber 12 is raised in excess of 1100 degrees, which in the presence of a catalyst, is sufficient to thermally decompose the noxious gases.

The interior of the muffler 10 is preferably lined with a liner 66 of a high temperature-resistant insulating material, such as a refractory tile, to retain the heat wtihin the chamber 12 and prevent deterioration of the walls 16, 17 and 18 forming the housing 11. The liner 60 is preferably formed of discrete sections such as a tubular section 67, and end sections 68 and 69 which are preferably removable for replacement in the event that breakage occurs due to collision of the housing.

An indicator means 70 is provided and schematically shown in FIGURE 1 for indicating the temperature within the chamber 12 so as to determine whether the operation is efficient, the indicator means forming a further means of policing the operation of the apparatus. Indicator means 70 shows schematically a thermal-couple means 71 extending within the chamber 12 and electrically connected to a pyrometer 72 located remotely, as within the interior of the vehicle and visible to the operator thereof. It is to be understood that the opening 73 extending through the end wall 17 and its insulator 68 is hermetically sealed to seal the chamber 12. The operating temperature within the chamber 12 is indicated on the scale of the pyrometer 72 so as to warn the operator if the temperature drops to an impractical point and the catalyst requires recoating or to indicate the condition of operation to a control officer.

Additionally, the high temperature within the chamber 12 may be advantageously utilized to heat the interior of the vehicle carrying the apparatus 10. For example, the cold water inlet may be formed as at 74 to be circulated within a portion of the housing 76 extending within the chamber 12 as indicated at 77 and exit through a hot water outlet 78 for transferring heat into the interior of the vehicle.

In actual laboratory tests, besides the results found in practical use on a vehicle, this invention provides a great reduction in the percentage and parts per million (p.p.m.) so as to thermally decompose irritant and noxious exhaust gases which cause the condition known as smog in areas having inversion atmospheric conditions.

To summarize a test conducted in a laboratory on this invention, a prototype of the invention as herein disclosed and described was conducted to one exhaust line of a test engine. An accessory equipment stand was constructed to hold a special fuel meter and pressurizing equipment, and a secondary air meter. A special absolute fuel meter was designed so it could be pressurized to any desired level. The purpose for this was to supply fuel to the burner housing located on top of the catalytic chamber. (This fuel would normally be supplied from the pressurized line to the carburetor). Sample lines were installed, one before and one behind the apparatus. Temperature measuring equipment consisted of two Ch—Al thermo-couples and a pyrometer. A blower and coil lead wires were connected through an ammeter to the battery post on a voltage regulator. The engine was started and the afterburner assembly was activated.

The active catalytic ingredient used was a coating of a metal oxide mixture, as previously described, on pumice stones, the pellets occupying approximately one-half of the area within the chamber to avoid excessive back pressure on the engine. A six-volt line was connected through a breaker into a common automobile ignition coil. The coil was used to supply a high voltage at the spark plug at periodic intervals determined by the speed of the blower motor. The spark was in a sense continuous and was able to ignite the mixture instantly.

In the tests, the afterburner was successful in appreciably reducing partly burned and unburned hydrocarbons during idle and deceleration stages. As an example, during an idle run of 520 r.p.m. of the engine, the hydrocarbons were reduced from 1300 p.p.m. to 280 p.p.m. and during a deceleration run of 1820 r.p.m., the hydrocarbons were reduced from 7100 p.p.m. to 160 p.p.m., concluding that the p.p.m. of hydrocarbons were substantially reduced to a safe proportion which is not irritant in the atmosphere at the operations which are normally the highest percentage of smog producing gases, idling and decelerating (see chart of Typical Analysis of Automobile Exhaust Gases, supra).

While there is herein shown and described in this invention in what is conceived to be the most practical and preferred embodiment of this invention, it is to be understood that alterations and modifications thereof may be made in a manner to satisfy the spirit of this invention which is intended to comprehend any and all equivalent devices as comprehended in the following claims.

What is claimed as new and desired to secure by Letters Patent is:

1. An apparatus for purifying the exhaust gases of an internal combustion engine and the like comprising a walled housing defining a chamber having an inlet at one end adapted to be connected to an exhaust manifold of the engine and an outlet at an opposite end, a basket of foraminous material supported in said chamber so as to receive a flow of said exhaust gas therearound and therethrough, a plurality of irregularly shaped catalytic pellets in said basket, each pellet comprising a core of relatively porous and high temperature tolerant material having a relatively thin coating of a metal oxide catalytic material, and each being re-coatable with metal oxide by a fluid mixture of said metal oxide in a rapid setting cementitious adhesive material, means defining a passageway through said housing for communicating said fluid mixture through the wall of said housing and in contact with said pellets for selectively recoating said pellets with said fluid mixture of metal oxide while said pellets reside in said basket, and heating means in said chamber for selectively heating said catalytic pellets to accelerate the temperature thereof so as to oxidize the partially burned and unburned hydrocarbons and other fractions of said exhaust gases for chemical decomposition thereof, said heating means including housing means defining a cylindrical air intake chamber mounted on said housing and having a cylindrical combustion chamber communicating therewith and extending inwardly of said first chamber adjacent said pellets and between said inlet and outlet, said air intake chamber being adapted to receive ambient air, nozzle means within said combustion chamber adapted to be connected to a source of raw fuel for selectively injecting said fuel into said combustion chamber to be mixed with said ambient air, igniting means extending into the said combustion chamber and adapted to be connected to an electrical circuit so as to selectively ignite and burn a mixture of said fuel and air, the side walls of said combustion chamber having parts therethrough communicating with said first mentioned chamber, said combustion chamber having an open end adjacent said catalytic pellets, a baffle in said open end for dispersing the burning mixture over said pellets, said catalytic pellets being heated to a relatively high temperature for burning the partially burned and unburned hydrocarbons and other noxious fractions of said exhaust gas for decomposition thereof in response to combustion of said mixture in said combustion chamber.

2. An apparatus as defined in claim 1 including second inlet means communicating with the interior of said first chamber and adapted to be connected to the crank case of the internal combustion engine so as to communicate oil vapors therefrom to induce said vapors to said first chamber for combustion thereof by said combustion means.

References Cited in the file of this patent
UNITED STATES PATENTS

| | | |
|---|---|---|
| 1,402,814 | Wachtel | Jan. 10, 1922 |
| 1,834,126 | Hyatt | Dec. 1, 1931 |
| 1,858,637 | McDonald | May 17, 1932 |
| 2,017,481 | Von Opel | Oct. 15, 1935 |
| 2,862,354 | Barnhart | Dec. 2, 1958 |
| 2,880,079 | Cornelius | Mar. 31, 1959 |
| 2,909,415 | Houdry | Oct. 20, 1959 |
| 2,912,300 | Cannon et al. | Nov. 10, 1959 |
| 2,937,490 | Calvert | May 24, 1960 |
| 2,942,932 | Elliott | June 28, 1960 |